United States Patent [19]

Jung et al.

[11] 4,010,069
[45] Mar. 1, 1977

[54] NUCLEAR REACTOR FUEL ROD

[75] Inventors: Wilfried Jung, Erlangen; Werner Kaden, Tennenlohe; Peter Rau, Mittelehrenbach, all of Germany

[73] Assignee: Siemens Aktiengesellschaft, Munich, Germany

[22] Filed: May 5, 1975

[21] Appl. No.: 574,691

Related U.S. Application Data

[63] Continuation of Ser. No. 326,467, Jan. 24, 1973, abandoned.

[30] Foreign Application Priority Data

Jan. 26, 1972 Germany .......................... 2203518

[52] U.S. Cl. ..................................... 176/68; 176/79
[51] Int. Cl.² ........................................... G21C 3/02
[58] Field of Search ................................ 176/68, 79
[56] References Cited

UNITED STATES PATENTS

| 3,274,066 | 9/1966 | Zumwalt | 176/68 |
|---|---|---|---|
| 3,519,537 | 8/1970 | Ferrari | 176/68 |
| 3,697,377 | 10/1972 | Gauthron | 176/68 X |
| 3,704,202 | 11/1972 | Reeve et al. | 176/68 X |
| 3,725,635 | 4/1973 | Fink et al. | 176/79 X |
| 3,772,147 | 11/1973 | Bratton et al. | 176/68 |

FOREIGN PATENTS OR APPLICATIONS 44-24250  4/1969  Japan ............................ 176/68

*Primary Examiner*—Samuel W. Engle
*Assistant Examiner*—Peter A. Nelson
*Attorney, Agent, or Firm*—Kenyon & Kenyon Reilly Carr & Chapin

[57] ABSTRACT

A nuclear reactor fuel rod is disclosed in which fission gases from the nuclear reaction are retained for a short time period to permit decay of the radioactivity present in the gases and then permit the removal of the gases from the rod. To accomplish this one of the end caps of the rod has a hole drilled in it and is connected to a fission gas removal system in the reactor. A separate container, containing pressed filter material such as, activated carbon, is metallurgically connected to the perforated end cap. At least on the side of the filter into which the fission products initially pass, a porous element is used to permit the fission products to pass into the filter material in a finely divided state without a large pressure drop.

1 Claim, 3 Drawing Figures

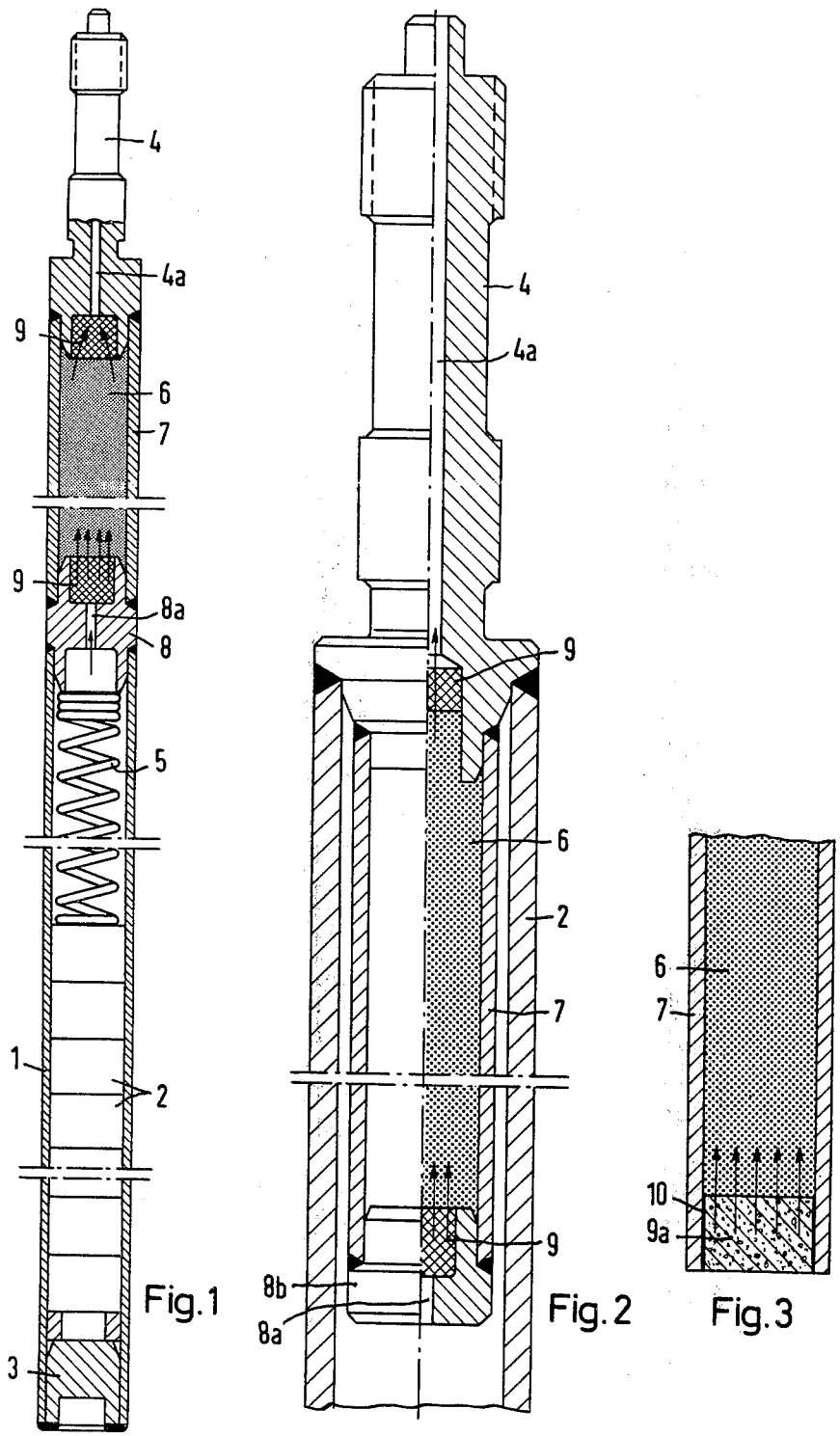

NUCLEAR REACTOR FUEL ROD

This is a continuation, of application Ser. No. 326,467, filed Jan. 24, 1973, now abandoned.

BACKGROUND OF THE INVENTION

1. Field of the Invention.

This invention is concerned with a nuclear reactor fuel rod comprised of a thin-walled tubular casing enclosing the nuclear fuel charge and closed off at both ends by end caps. The rod is also equipped with a mechanism to hold back and, after a time delay, carry off fission products by means of the combination of a gas-absorbing filter material, and of a hole provided in the adjoining end cap. Such nuclear reactor fuel rods are also called vented fuel rods and are used mainly in gas-cooled nuclear reactors. The fuel elements are assembled from them by attaching the fuel elements at the fuel rod support plate by one of the end caps. On the inside or the outside of this place a system of pipes is connected to the gas discharge holes of the individual fuel-rod end caps. After fuel elements of this type are inserted into a nuclear reactor, the manifolds of each fuel element are connected to the gas discharge system of the nuclear reactor plant, which, however, is not the subject of the present invention and will not be discussed in detail.

The gas-absorbing filter material provided in the individual fuel rods, may consist, for example, of activated carbon. Its purpose is to retain the gaseous fission products for a certain time period during which the principal radioactivity of the products can decay. The fission products escaping via the gas discharge lines are thus released only after a time delay and then only when they have a relatively low level of radioactivity. Customarily, this filter material is placed in the tubular casings following the nuclear fuel charge. This solution, however, presents the disadvantage that the space between the tubular casing and the charge of filter material charge cannot in practice be made sufficiently small so that the bypass flow of the gaseous fission products, formed by this design, is negligibly small. Furthermore, by this type of design, the contact between the filter material and the fission products which are to be absorbed does not reach its optimum value.

SUMMARY OF THE INVENTION

In vented fuel rods, however, because of the subsequent processing of the escaping fission products, the very strictest requirements are called for in exactly this respect. According to this invention, this problem is solved by arranging the filter material in a separate container, metallurgically connected with the perforated end cap. At least on the fission products input side of this container, a porous element is used into which the fission products can diffuse. This element is preferably hermetically joined to the material of the container, for example, by soldering and to avoid the previously mentioned bypass flow, the filter material is pressed into the container.

BRIEF DESCRIPTION OF THE DRAWINGS

In order to further illustrate the principles of the invention, two design embodiments for vented fuel rods are shown in the drawings of which FIG. 1 illustrates the fuel rod in a fragmentary longitudinal view in partial section;

FIG. 2 illustrates the fuel rod in an enlarged fragmentary partial longitudinal view in partial section; and FIG. 3 is a partial longitudinal section of a modification of the filter container of FIG. 2.

DESCRIPTION OF THE PREFERRED EMBODIMENTS

As shown in FIG. 1, the fuel rod consists of a tubular casing 1, a nuclear fuel charge 2, which may be in the form of pellets, a lower end cap 3, an upper end cap 4 having a central hole 4a as well as a spring 5 for holding down the nuclear fuel pellets 2, and activated carbon filter material 6. This filter material 6 may be pressed into the fuel rod and enclosed by a tubular casing 7 having the same outside diameter as the tubular casing 1. This tubular casing 7 on one end is welded to the upper end cap 4 and on the other end is "plugged" by means of an intermediate cap 8, thus forming a container of its own. It also is welded to the rest of the fuel rod, i.e., to the tubular casing of the latter, 1. The intermediate cap 8 has a central hole 8a to pass the fission products, and a cup-shaped recess to receive a porous element 9, which is particularly used to feed the fission products to the filter zone 6 in a finely distributed state without a large pressure drop. A material through which the fission products can diffuse, such as for example, porously sintered $Al_2O_3$, is therefore particularly advantageous for this purpose.

The retention time of the fission products in the filter material is also influenced by a similar porous or diffusable material 9 in front of the hole 4a of the end cap 4.

In the embodiment shown in FIG. 2, only the upper portion of the fuel rod is shown. Similar parts are again labelled with the same reference symbols. Here, the tubular casing 2 passes through from the lower end cap 3 to the upper end cap 4; the filter material consisting of activated carbon 6 is located in a separate container inside this tubular casing 2. The container formed on the one hand by tubular part 7, a filter end cap 8b having a hole 8a and an end cap 4, to which the cylindrical part 7 is welded. As shown in FIG. 1 the porous material 9 is located at both ends of the activated charcoal or other type of filter material 6. The embodiment shown in FIG. 2 has the great advantage that the tubular casing is undivided and passes through the entire length of the fuel rod without additional welded joints.

FIG. 3 illustrates a minor modification which can be made in this container, containing the filter material. Here, a separate filter end cap 8b is dispensed with and instead, the porous material 9 is inserted into the tube 7 as an end plug 9a and is joined to the porous material in a gastight manner, for example, by a hard-solder joint 10.

The element 9 of porous material also can be connected with the end cap material in a gastight manner on the other side of the filter insert. In this way, additional bypass possibilities, which have a reducing effect on the retention time of the fission products, are avoided.

By means of these design possibilities or the underlying principle, it is possible not only to improve very considerably the operation of the fission gas venting system, but it is also possible to manufacture the container which encloses the filter material 6 by separate operations, so that in the manufacture of the fuel rods the filter material can be inserted without additional handling problems. It is further more an essential feature of the invention that the filter material is pressed into the container. It is advantageous here in particular if the diameter of the container, after being filled, is reduced by commonly known methods and the contact with the filter material is improved, which is not possible in known fuel rod designs with filter zones.

In the foregoing, the invention has been described in reference to specific exemplary embodiments. It will be evident however, that variations and modifications, as well as the substitution of equivalent constructions and arrangements for those shown for illustration, may be made without departing from the broader scope and spirit of the invention as set forth in the appended claims. The specification and drawing are accordingly to be regarded in an illustrative rather than a restrictive sense.

What is claimed is:

1. A vented nuclear fuel rod comprising a tubular casing having upper and lower ends and which is integral throughout between said ends, a lower end cap closing said lower end, said upper end having an upper end cap having a substantially central, axially extending hole formed therethrough and a flange which is welded to said upper end, said casing having an inside and said upper end cap having a tubular stub projecting into said casing and radially spaced from said inside, a tubular filter casing inside of the first-named casing and having an upper end which is welded to said tubular stub, said filter casing having a lower end and a filter end cap welded thereto and through which a hole extends axially, said filter casing having an inside in which filter material is pressed to a degree preventing gas by-passing between the material and the inside of the filter casing, and nuclear fuel positioned within the first-named casing's said inside between said filter end cap and said lower end cap of the first-named casing.

* * * * *